3,489,792
HALOGENATED BICYCLOHEPTENYL
COMPOUNDS
Sheldon B. Greenbaum, Tonawanda, Samuel Gelfand,
 Niagara Falls, and Edward D. Weil, Yonkers, N.Y.,
 assignors to Hooker Chemical Corporation, Niagara
 Falls, N.Y., a corporation of New York
No Drawing. Continuation-in-part of application Ser. No.
 142,514, Oct. 3, 1961. This application Mar. 14, 1966,
 Ser. No. 533,847
Int. Cl. C07c 79/20; A01n 9/20
U.S. Cl. 260—471            13 Claims This is a continuation-in-part of Ser. No. 142,514, filed Oct. 3, 1961, now abandoned.

This invention describes certain novel halogenated bicycloheptenyl derivatives useful as biocides and as organic intermediates for preparing biocidally active compounds, as well as to novel processes for preparing these compositions.

More particularly, this invention relates to insecticides and pesticides, referred to as esters of 2-halomethyl-1,4,5,6,7,7-hexahalobicyclo-(2.2.1)-hept-5-ene-3 - carbinol and their chlorinated products containing one to four atoms of chlorine. The esters are of the structure:

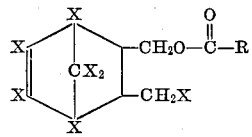

wherein X is a halogen, the same or different and R is chosen from the group consisting of alkyl, aryl, heterocyclic,

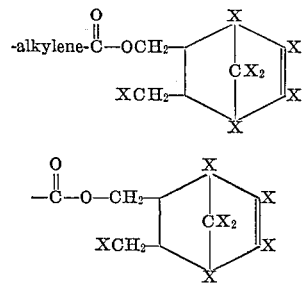

The alkyl group is preferably of 1 to 18 carbon atoms, more preferably of 1 to 4 carbon atoms. The aryl group may be naphthalenic but is preferably mononuclear and of 6 to 18 carbon atoms. When R is heterocyclic, it is preferably of 4 to 18 carbons and the heterocyclic ring preferably contains only either nitrogen, oxygen or phosphorus, in addition to carbon. The alkylene group of

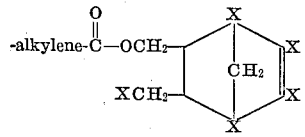

is preferably of 1 to 8 carbon atoms. Substituents which may be on the various radicals, R, include the halogens, preferably chlorine or bromine, but also including iodine and fluorine, alkyl groups, preferably of 1 to 8 carbon atoms, phenyl, chlorophenyl and bromophenyl, and other non-interfering substituents from the group of nitro-, amino-, nitrilo-, lower alkoxy, phenoxy and lower alkenyl. Preferably, R will be either unsubstituted or monosubstituted but polysubstitution, up to about 4 substituents is also within the invention.

Illustrative examples of the compounds of this invention include but are not limited to the following:

2-chloromethyl-1,4,5,6,7,7-hexachlorobicyclo-(2.2.1)-
 hept-5-en-3-ylmethyl acetate;
2-chloromethyl-1,4,5,6,7,7-hexabromobicyclo-(2.2.1)-
 hept-5-ene-3-ylmethyl acetate;
2-chloromethyl-1,4,5,6,7,7-hexachlorobicyclo-(2.2.1)-
 hept-5-ene-3-ylmethyl propionate;
2-chloromethyl-1,4,5,6,7,7-hexachlorobicyclo-(2.2.1)-
 hexachlorobicyclo-(2.2.1)-hept-5-ene-3-ylmethyl butyrate;
2-chloromethyl-1,4,5,6,7,7-hexachlorobicyclo-(2.2.1)-
 hept-5-en-3-ylmethyl valerate;
2-chloromethyl-1,4,5,6,7,7-hexachlorobicyclo-(2.2.1)-
 hept-5-en-3-ylmethyl hexaonate;
2-chloromethyl-1,4,5,6,7,7-hexachlorobicyclo-(2.2.1)-
 hept-5-en-3-ylmethyl decanoate;
2-chloromethyl-1,4,5,6,7,7-hexachlorobicyclo-(2.2.1)-
 hept-5-en-3-ylmethyl stearate;
2-chloromethyl-1,4,5,6,7,7-hexachlorobicyclo-(2.2.1)-
 hept-5-en-3-ylmethyl benzoate;
2-chloromethyl-1,4,5,6,7,7-hexachlorobicyclo-(2.2.1)-
 hept-5-en-3-ylmethyl furoate;
2-chloromethyl-1,4,5,6,7,7-hexachlorobicyclo-(2.2.1)-
 hept-5-en-3-ylmethyl picolinate;
2-chloromethyl-1,4,5,6,7,7-hexachlorobicyclo-(2.2.1)-
 hept-5-en-3-ylmethyl oxalate;
2-chloromethyl-1,4,5,6,7,7-hexachlorobicyclo-(2.2.1)-
 hept-5-en-3-ylmethyl malonate;
2-chloromethyl-1,4,5,6,7,7-hexachlorobicyclo-(2.2.1)-
 hept-5-en-3-ylmethyl succinate and
2-chloromethyl-1,4,5,6,7,7-hexachlorobicyclo-(2.2.1)-
 hept-5-en-3-ylmethyl adipate.

In their composition aspect the products of this invention offer several advantages of commercial significance. For example, the ester products and particularly, the chlorinated ester products of this application are extremely potent contact insecticides against a variety of crawling and flying insects including the housefly, mosquito, cockroaches, ants, spiders, beetles, thrips and grasshoppers, among many others. Since it is well known that insects are among the important carriers or vectors of infection and disease, an insecticide having a broad spectrum of insecticidal activity such as the inventive composition are especially valuable from a public health standpoint.

That the compositions of this invention are pesticidally active at all is most surprising in view of the inactivity of closely related compounds possessing the two

groups sans a chloromethyl (CH$_2$Cl). For example, the structure:

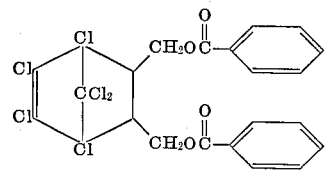

is inactive but where one group of

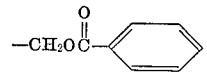

is replaced by CH$_2$Cl, the compounds show good activity as a contact inseticide. As stated, infra, further chlorination substantially enhances the contact activity of the product.

Ancillary but important advantages of the novel products of this invention are long insecticidal persistence, rapid action and relative innocuousness to mammals, as well as lack of phytotoxicity.

An additional advantage of the products of this invention is the variety of formulations in which they may be utilized for insecticidal use. For example, the products purified or crude may be combined wtih other biocides or pesticides, including insecticides, such as DDT, methoxychlor, lindane, aldin, endrin, DDD, BHC, parathion, malathion, methyl parathion, lead arsenate, calcium arsenate, rotenone, allethrin, pyrethrum, nicotine, summer oils, dormants oils, dinitroalkylphenols, dinitrocresols, chlordane, heptachlor, insecticidal carbamates and organophosphates; chlorinated terpenes, dimeton, thiophosphates and dithiophosphates such as Guthion, Diazinon, Dibrom and others; miticides such as bis(pentachlorocyclopentadienyl), chlorinated arylsulfonates, chlorinated diarylsulfones, and the like, fungicides such as sulfur, dithiocarbamates and N-trichloromethylthio-4-cyclohexene-1,2 - dicarboximide to list but a few.

It may be also be desirable to combine the insecticidal products of this invention with a class of potentiators or synergists known in the insecticidal art as "knockdown agents." These substances are insecticides which when combined with other insecticides will shorten the time required, or reduce the amounts of the insectcide necessary to effect total immobilization (knockdown) or death of the insect to be controlled. Among the larger number of synergists which may be used for this purpose are the organic thiocyanates and the water soluble organophosphates, such as phosdrin, and "Sesoxane" (2,3,4-methylenedioxyphenoxy)-3,6,9-trioxaundecane, to name but a few.

Another advantage of the inventive compositions is that they may readily be formulated as solids or liquids using solid or liquid solvent vehicles, carriers or extenders.

Suitable diluents are solids or liquids of an inert nature. Illustrative solid diluents include among many others: sawdust, clay, talcs, flours, silicas, alkaline earth carbonates, oxides and phosphates, sulfur and the like.

Suitable solvents for liquid formulations include water, ketones, alcohols, aromatic and aliphatic hydrocarbons and petroleum fractions or distillates.

Whether dissolved or dispersed, supended or emulsified in a liquid or formulated as a dust or powder or some other solid preparation the insecticides of this invention may advantageously contain one or more substances known or referred to variously as modifiers, wetting agents, surface active agents, dispersing agents, suspending agents, emulsifying agents or conditioning agents, said materials being referred to herein generically as adjuvants. Thus, any substance which facilitate formulation, handling and application of the insecticide of this invention may be profitably incorporated in the insecticdal compostion. Frequently, said adjuvants enhance or potentiate insecticidal effectiveness. A satisfactory but not exhaustive list of these substances appears among other places in "Soap and Chemical Specialties," vol. 31, pp. 50–61; No. 8, pp. 48–61; No. 9, pp. 52–67 and No. 10, pp. 38–67 (1955). Another excellent source of this information is Bulletin E–607 of the Bureau of Entomology and Plant Quarantine of the United States Department of Agriculture.

The insecticidal compositions of this invention may be applied as a dust or a spray using among other things, any of the above-mentioned exemplified formulations.

The preferred method of application is a spray using petroleum fractions or distillates as diluents plus one or more conditioning agents as formulation adjuvants. Ordinarily, a typical spray will contain between 0.001 and ten percent by weight of insecticide with the remaining material being made up largely by solvent with a small amount of adjuvant.

In its process aspects, this invention offers the advantage of two different economically feasible processes for preparing the compositions of this invention in good yield by one step processes using commercially available starting materials. The first process is to heat a solution of equimolar quantities of 4,5,6,7,8,8-hexahalo-3a,4,7,7a-tetrahydro-4,7-methanophthalan and the appropriate aliphatic, aromatic or heterocyclic acid chloride in the presence of a catalyst such as $ZnCl_2$, $AlCl_3$, $BF_3$ or $FeCl_3$. The reaction is set forth below:

(1)

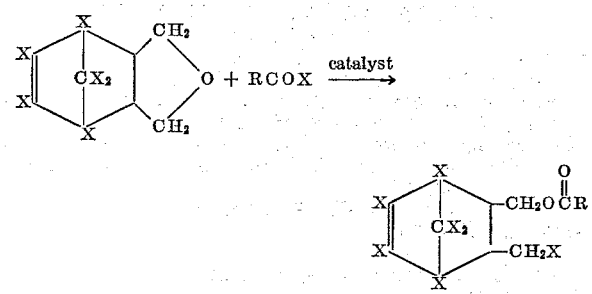

wherein X is halogen, the same or different and R is chosen from the group consisting of alkyl, aryl and heterocyclic, as described before.

The above reaction proceeds at relatively wide ranges of temperatures, minus ten degrees to plus two hundred and fifty degrees centigrade, depending upon the reactivity of the acid chloride. However, satisfactory yields can be obtained even at somewhat lower and higher temperatures if the reaction time can be proportionately raised or lowered. Where both reactants are liquids, it is possible to run the reaction without using a diluent, although a diluent such as an inert aromatic or aliphatic hydrocarbon makes for a smoother reaction. After the reactants have been allowed to react with vigorous stirring for one to eight hours, the heat source is removed and the reaction mixture is allowed to cool to room temperature and remain at this temperature for one to three hours. At this point, the ester product is distilled off (if a liquid), or fractionally crystallized, if a solid.

An alternative preparation is to beat equimolar quantities of a hexahalocyclopentadiene and a 1-acyloxy-4-halobutene-2 to a temperature of between one hundred and twenty to one hundred and eighty degrees centigrade, preferably about one hundred and fifty to one hundred and sixty degrees centigrade for a period of thirty to eighty hours depending upon the reactivity of the reactants. Again depending upon the physical characteristics of the product, distillation or crystallization is used to separate and purify the products from by-products, diluents and catalysts. The alternative process is as follows:

(2)

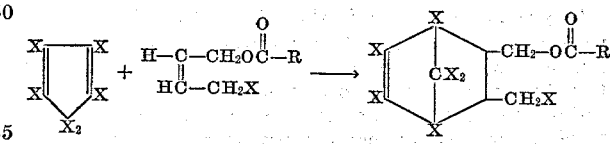

While the ester products from both of the above disclosed processes give rise to an insecticidally active product, a pronounced enhancement of insecticidal activity results when the ester product is chlorinated so that one to four chlorine atoms are taken up into the molecule. While no mechanism, or theory is advanced regarding the structure of the chlorinated products, based on empirical observations, it is believed that the initial one or two atoms of chlorine are taken up on the —$CH_2$— groups of the ester linkage to produce —CHl—O— or —$CCl_2$—O— groups. A more detailed discussion of the chlorination process and products appear in the examples which follow.

EXAMPLE 1

Preparation of 2-chloromethyl-1,4,5,6,7,7-hexachloro-bicyclo-(2.2.1)-hept-5-en-3-ylmethyl benzoate A mixture of thirty-four grams of 4,5,6,7,8,8-hexachloro-3a,4,7,7a-tetrahydro-4,7 - methanophthalan, fourteen grams of benzoyl chloride and one gram of zinc chloride is heated at two hundred and eight to two hundred and twenty degrees centigrade for 1.25 hours. After standing overnight, the viscous syrup is dissolved in n-hexane, freed of insoluble matter by filtration and crystallized by cooling. The crystalline product melts at one hundred and twenty-two to one hundred and twenty-four degrees centigrade. Infrared analysis confirms the presence of the described benzoyl ester. When, in place of benzoyl chloride, other suitable aryl chlorides, such as chloro or lower alkyl-substituted aroyl, e.g., benzoyl chlorides, are used, corresponding esters are made.

*Analysis.*—Calculated for $C_{16}H_{11}O_2Cl_7$: Cl, 51.3 percent. Found: Cl, 51.5 percent.

EXAMPLE 2

Chlorination of the product of Example 1

Solutions containing 24.2 grams of the product of Example 1 dissolved in one hundred milliliters of carbon tetrachloride are treated with elementary chlorine at sixty to seventy degrees centigrade in the presence of ultraviolet light. The chlorinations are conducted so as to afford 1, 2, 3 and 4 moles of reacted chlorine per mole of starting material. In each case, the progress of the chlorination is followed by titration of the hydrogen chloride released into a suitable trap. After a nitrogen purge, the solvent is removed under reduced pressure and this affords a series of the desired chlorinated products as viscous yellow oils designated as A, B, C and D.

|   | Moles HCl/Moles of Reactant | Percent Cl (Found) |
|---|---|---|
| A | 1.01 | 54.6 |
| B | 2.06 | 57.7 |
| C | 2.96 | 60.3 |
| D | 4.3 | 62.7 |

EXAMPLE 3

Preparation of 2-chloromethyl-1,4,5,6,7,7-hexachlorobicyclo-(2.2.1)-hept-5-en-3-ylmethyl acetate (A) Cis-2-butene-1,4-chlorohydrin is prepared as follows: one kilogram of cis-2-butene-1,4-diol is dissolved in a mixture of 1.29 liters of triethylamine and 1.75 liters of anhydrous ether. The mixture is stirred and treated with eight hundred and two milliliters of thionyl chloride at minus five to five degrees centigrade over two and one-half hours. The triethylamine hydrochloride is removed, washed with benzene, and the washings and filtrate are poured onto ice with vigorous stirring. The organic layer is removed and dried over magnesium sulfate. Distillation through a packed column gives a cut distilling at seventy-three to seventy-six degrees centigrade/ten to thirteen millimeters, $n_D^{20}$ 1.4739, which is taken as the desired chlorohydrin.

(B) Preparation of 2-butene-1,4-chlorohydrin monoacetate: 53.5 grams of 2-butene-1,4-chlorohydrin and sixty grams of triethylamine are dissolved in three hundred milliliters of dry toluene. 47.2 grams of acetyl chloride dissolved in one hundred and fifty milliliters of toluene is added over a period of one hour at zero plus or minus five degrees centigrade with stirring. The mixture is then allowed to warm up and stir at room temperature for two additional hours. Removal of the triethylamine hydrochloride gives a filtrate which is fractionated to give the desired product boiling at ninety-five degrees centigrade/twenty-six to twenty-eight millimeters.

(C) Reaction of hexachlorocyclopentadiene with 2-butene-1,4-chlorohydrin monoacetate: A mixture of 7.5 grams of 2-butene-1,4-chlorohydrin monoacetate and 13.5 grams of hexachlorocyclopentadiene is heated to one hundred and fifty degrees centigrade for forty hours. The mixture is then stripped of solvent and fractionated. The desired product, 2-chloromethyl-1,4,5,6,7,7-hexachlorobicyclo-(2.2.1)-hept-5-en-3-ylmethyl acetate, distills at one hundred and forty-five to one hundred and forty-eight degrees centigrade/0.25 millimeters (13.0 grams). Similar useful products are made by using 2-butene-1,4-chlorohydrin mono-lower alkanoates, such as the lower propionate, hexanoate or decanoate.

*Analysis.*—Calculated for $C_{11}H_9O_2Cl_7$: Cl, 58.9 percent. Found: Cl, 59.5 percent.

EXAMPLE 4

Chlorination of product of Example 3 with one mole of chlorine 19.5 grams of the product of Example 3 is dissolved in one hundred milliliters of carbon tetrachloride and treated with gaseous chlorine at sixty to seventy degrees centigrade. The progress of the reaction is followed by titration of the hydrogen chloride released into a trap. When one equivalent of hydrogen chloride per mole of compound is obtained, the reaction is stopped and the solvent removed under reduced pressure. The final product is the desired chlorinated reactant, obtained as a viscous, yellow oil.

EXAMPLE 5

Preparation of 2-chloromethyl-1,4,5,6,7,7-hexachlorobicyclo-(2.2.1)-hept-5-en-3-ylmethyl (4-nitrobenzoate)

9.3 grams of p-nitrobenzoyl chloride, 1.1 gram of 4,5,6,7,8,8 - hexachloro-3a,4,7,7a-tetrahydromethanophthalan and 0.5 gram of anhydrous zinc chloride are heated to two hundred degrees centigrade for one hour and then to two hundred and forty degrees centigrade for an additional two hours. After cooling, the mixture is extracted with hexane. Evaporation of the solvent and recrystallization of the residue from ethanol give the product in the form of crystals melting at one hundred and twenty-three to one hundred and twenty-six degrees centigrade. By using other suitable substituted benzoyl chlorides such as methyl- or chlorobenzoyl chlorides, corresponding desirable products are obtained.

*Analysis.*—Calculated for $C_{15}H_{10}NO_4Cl_7$: N, 2.68 percent. Found: N, 2.64 percent.

EXAMPLE 6

Insecticidal testing of products of this invention on houseflies

Fifty adult houseflies of the Chemical Manufacturers Association strain are sprayed with aqueous dispersions of the test chemical at various concentrations in a two by five inch diameter stainless steel cage faced on top and bottom with fourteen mesh screen. The flies are retained in the cage in which they are sprayed for knockdown twenty-four observations and mortality determination.

| Preparation from Example | Percent Knockdown | | Percent Kill | |
|---|---|---|---|---|
| | Concentration | | Concentration | |
| | 1 Percent | 0.1 Percent | 1 Percent | 0.1 Percent |
| I | 0 | 0 | 32 | 22 |
| IIA | 25 | 0 | 100 | 52 |
| IIB | 25 | 0 | 100 | 46 |
| IIC | 100 | 15 | 100 | 100 |
| IID | 100 | 50 | 100 | 100 |
| III | | | 100 | 98 |
| IV | | | 100 | 100 |

Although the present invention has been described in terms of certain embodiments or examples, it is not intended that this invention be limited by these embodiments or examples except as indicated by the following claims.

We claim:

1. An ester of 2-halomethyl-1,4,5,6,7,7-hexahalobicyclo-(2.2.1)-hept-5-ene-3-methanol of the structure:

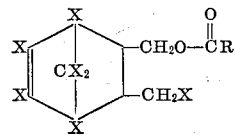

wherein X is halogen selected from the group consisting of chlorine, bromine and fluorine and R is selected from the group consisting of alkyl of 1 to 18 carbon atoms, phenyl, nitrophenyl, chlorophenyl, bromophenyl, furyl, pyridyl, naphthyl,

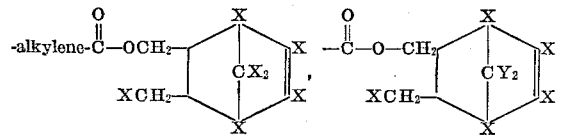

and chlorinated products thereof containing from 1 to 4 additional chlorine atoms per molecule.

2. An ester according to claim 1 wherein X is a halogen selected from the group consisting of chlorine and bromine and R is selected from the group consisting of alkyl of 1 to 18 carbon atoms, phenyl, nitrophenyl, chlorophenyl, bromophenyl, furyl, pyridyl, naphthyl,

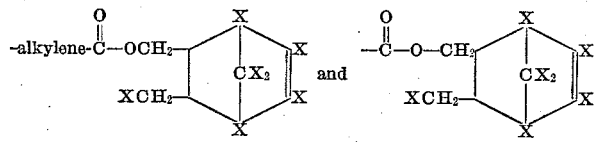

3. An ester according to claim 2 wherein X is chlorine.
4. An ester according to claim 3 wherein R is selected from the group consisting of alkyl of about 1 to 18 carbon atoms, phenyl, nitrophenyl, chlorophenyl, bromophenyl, furyl, pyridyl, naphthyl,

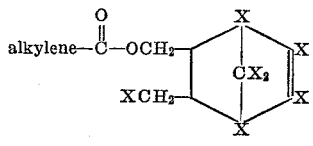

wherein akylene is of 1 to 8 carbon atoms, and

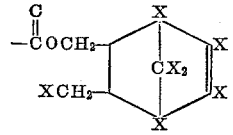

5. A compound according to claim 4 of the formula:

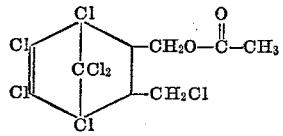

6. A compound according to claim 4 of the formula:

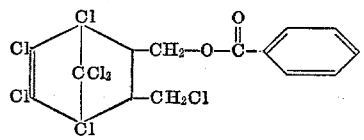

7. A compound according to claim 4 of the formula:

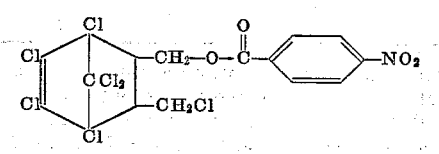

8. An insecticidal compound obtained by chlorinating an ester of 2-halomethyl-3-substituted bicycloheptene-5 of the structure:

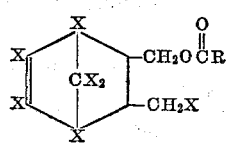

wherein R is selected from the group consisting of alkyl of 1 to 18 carbon atoms, phenyl, nitrophenyl, chlorophenyl, bromophenyl, furyl, pyridyl, naphthyl,

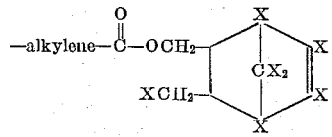

and

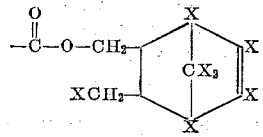

and X is a halogen selected from the group consisting of chlorine, fluorine and bromine, with from about 1 to 4 moles of elemental chlorine per mole of said reaction until between about 1 and about 4 moles of hydrogen chloride are evolved and the reaction product contains from 1 to 4 additional chlorine atoms per molecule.

9. A compound according to claim 8 obtained by chlorinating

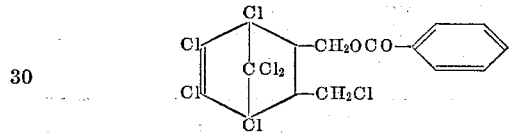

with from 1 to 4 atoms of chlorine per mole until it contains 1 to 4 additional chlorine atoms per molecule.

10. A compound according to claim 8 obtained by chlorinating

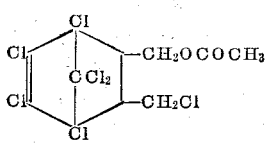

with about 1 atom of chlorine per mole until it contains 1 additional atom of chlorine per molecule.

11. An ester according to claim 1 wherein R is nitrophenyl.
12. An ester according to claim 11 wherein R is p-nitrophenyl.
13. An ester according to claim 12 wherein X is selected from the group consisting of chlorine and bromine.

References Cited

UNITED STATES PATENTS 2,841,484    7/1958   Johnson _____ 260—476

OTHER REFERENCES

Morrison et al.: Organic Chemistry, 1961, pp. 264–265 relied on, A. P. Dunlap et al., "The Furans," No. 119 (1953).

Rheinhold Publishing Corp., New York, N.Y. pp. 729–730 relied on.

LORRAINE A. WEINBERGER, Primary Examiner

L. A. THAXTON, Assistant Examiner

U.S. Cl. X.R.

260—295, 346.2, 347.5, 410, 469, 476, 485, 488; 424—266, 285, 310, 311, 312, 313

UNITED STATES PATENT OFFICE
CERTIFICATE OF CORRECTION

Patent No. 3,489,792　　　　　　　Dated January 13, 1970

Inventor(s)　　　- Sheldon B. Greenbaum et al.

It is certified that error appears in the above-identified patent and that said Letters Patent are hereby corrected as shown below:

Column 1, line 55, delete the formula

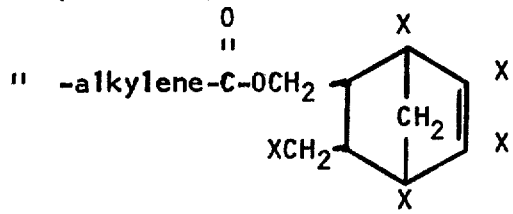

and insert --- 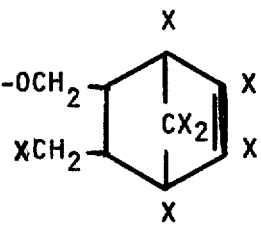

Column 2, line 4, delete "hept-5-ene-3-" and insert --- hept-5-en-3- ---.
Column 2, line 6, delete "hept-5-ene-3-" and insert --- hept-5-en-3- ---.
Column 2, line 8, delete "hept-5-ene-3-" and insert --- hept-5-en-3- ---.
Column 2, line 13, delete "hexaonate" and insert --- hexanoate ---.
Column 3, line 4, delete "wtih" and insert --- with ---;
Column 3, line 9, delete "dormants" and insert --- dormant ---.

Column 4, line 66, delete " -CH1-0-" and insert --- -CHCl-0- ---.
Column 7, Claim 4, second formula delete and insert ---

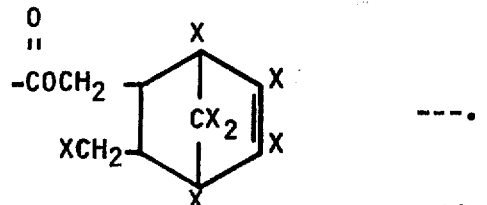

---.

SIGNED AND
SEALED

SEP 29 1970

(SEAL)
Attest:

Edward M. Fletcher, Jr.
Attesting Officer

WILLIAM E. SCHUYLER, JR.
Commissioner of Patents